US012641667B2

(12) United States Patent
Dalsgaard et al.

(10) Patent No.: US 12,641,667 B2
(45) Date of Patent: May 26, 2026

(54) BEAM SWITCHING IN CELLULAR COMMUNICATION NETWORKS

(71) Applicant: Nokia Technologies Oy, Espoo (FI)

(72) Inventors: Lars Dalsgaard, Oulu (FI); Rafael Cauduro Dias De Paiva, Aalborg (DK); Erika Portela Lopes De Almeida, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 306 days.

(21) Appl. No.: 18/451,319

(22) Filed: Aug. 17, 2023

(65) Prior Publication Data

US 2024/0064848 A1    Feb. 22, 2024

(30) Foreign Application Priority Data

Aug. 18, 2022    (FI) ...................................... 20225734

(51) Int. Cl.
| | |
|---|---|
| *H04W 76/20* | (2018.01) |
| *H04B 7/06* | (2006.01) |
| *H04L 1/1812* | (2023.01) |
| *H04W 72/1273* | (2023.01) |
| *H04W 72/21* | (2023.01) |

(52) U.S. Cl.
CPC .......... *H04W 76/20* (2018.02); *H04B 7/0695* (2013.01); *H04L 1/1812* (2013.01); *H04W 72/1273* (2013.01); *H04W 72/21* (2023.01)

(58) Field of Classification Search
CPC . H04W 76/20; H04W 72/1273; H04W 72/21; H04B 7/0695; H04B 7/0617; H04L 1/1812
See application file for complete search history.

(56) References Cited

U.S. PATENT DOCUMENTS

| | | | |
|---|---|---|---|
| 2020/0145148 A1* | 5/2020 | Yeo ....................... | H04L 1/1685 |
| 2021/0378042 A1 | 12/2021 | Cui et al. | |
| 2022/0007248 A1 | 1/2022 | Shrestha et al. | |
| 2022/0377796 A1* | 11/2022 | Jung .................... | H04L 1/1812 |
| 2023/0413283 A1* | 12/2023 | Matsumura ........... | H04L 1/1854 |
| 2024/0204971 A1* | 6/2024 | Raghavan ............. | H04L 5/0096 |

(Continued)

FOREIGN PATENT DOCUMENTS

WO        2022/147773 A1      7/2022

OTHER PUBLICATIONS

Notice of Allowance received for corresponding European Patent Application No. 23189141.7, dated Mar. 31, 2025, 6 pages.

(Continued)

*Primary Examiner* — Sharmin Chowdhury
(74) *Attorney, Agent, or Firm* — Nokia Technologies Oy

(57) ABSTRACT

According to an example aspect of the present disclosure, there is provided an apparatus comprising means for receiving, from a wireless network node, a Transmission Coordination Indication, TCI, state switch command, the TCI state switch command commanding the apparatus to perform at least an uplink TCI state switch, means for receiving, from the wireless network node, at least one downlink transmission before the uplink TCI state switch is required to be completed and means for transmitting, to the wireless network node, feedback information related to the at least one downlink transmission after completing the uplink TCI state switch.

16 Claims, 5 Drawing Sheets

(a)                                    (b)

(56) References Cited

U.S. PATENT DOCUMENTS

| | | | |
|---|---|---|---|
| 2025/0007676 A1* | 1/2025 | Matsumura | H04L 5/0094 |
| 2025/0089066 A1* | 3/2025 | Liu | H04B 7/088 |
| 2025/0106845 A1* | 3/2025 | Lim | H04W 72/1268 |

OTHER PUBLICATIONS

"3rd Generation Partnership Project; Technical Specification Group Radio Access Network; NR; Requirements for support of radio resource management (Release 17)", 3GPP TS 38.133, V17.6.0, Jun. 2022, 3637 pages.

"3rd Generation Partnership Project; Technical Specification Group Radio Access Network; NR; Physical layer procedures for control (Release 17)", 3GPP TS 38.213, V17.2.0, Jun. 2022, pp. 1-256.

"Remaining issues on Unified TCI for DL and UL", 3GPP TSG RAN WG4 Meeting #104-e, R4-2213939, Agenda: 9.17.2.1, Ericsson, Aug. 15-26, 2022, pp. 1-6.

"3rd Generation Partnership Project; Technical Specification Group Radio Access Network; NR; Radio Resource Control (RRC) protocol specification (Release 17)", 3GPP TS 38.331, V17.1.0, Jun. 2022, pp. 1-1273.

Office action received for corresponding Finnish Patent Application No. 20225734, dated Feb. 13, 2023, 9 pages.

"Discussion on RRM requirements for unified TCI in R17 feMIMO", 3GPP TSG-RAN WG4 Meeting # 102-e, R4-2204339, Agenda: 10.19.3.1, vivo, Feb. 21-Mar. 3, 2022, pp. 1-11.

Extended European Search Report received for corresponding European Patent Application No. 23189141.7, dated Feb. 8, 2024, 4 pages.

"Email discussion summary for [104-bis-e][205] NR feMIMO RRM 1", 3GPP TSG-RAN WG4 Meeting #104b-e, R4-2217138, Agenda: 4.5.1, Intel, Oct. 10-19, 2022, 50 pages.

* cited by examiner

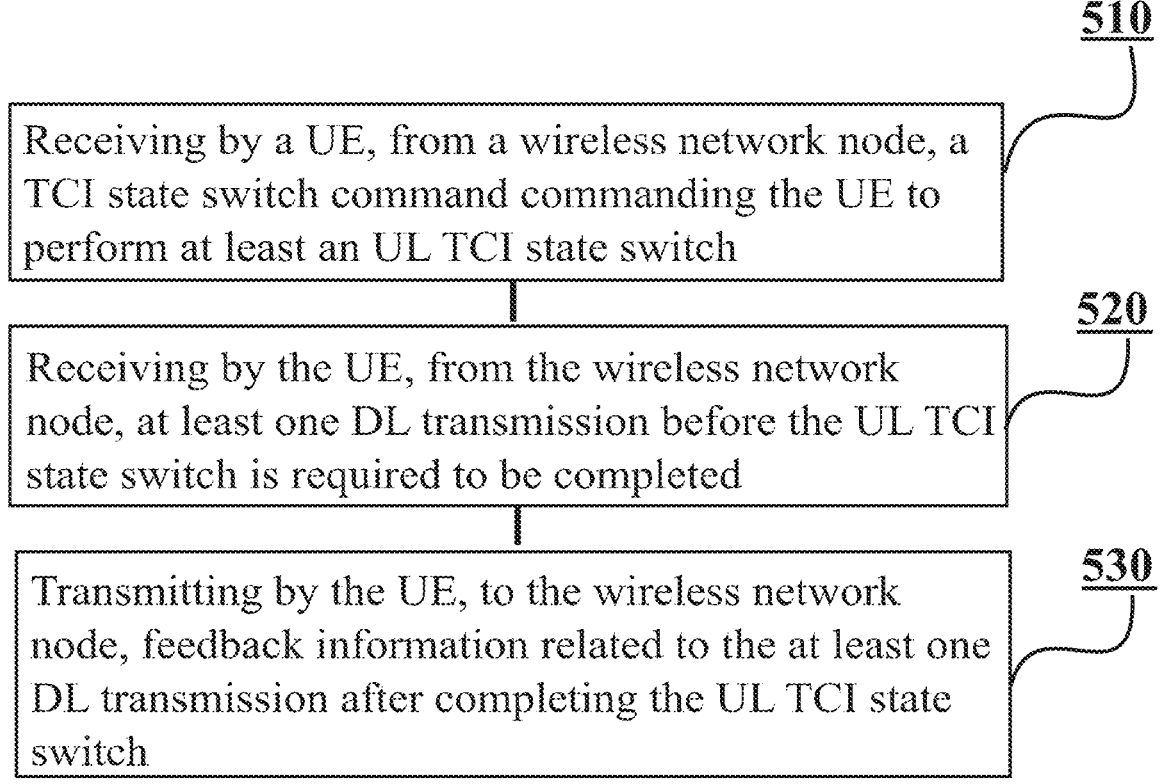

<u>510</u>

Receiving by a UE, from a wireless network node, a TCI state switch command commanding the UE to perform at least an UL TCI state switch <u>520</u>

Receiving by the UE, from the wireless network node, at least one DL transmission before the UL TCI state switch is required to be completed <u>530</u>

Transmitting by the UE, to the wireless network node, feedback information related to the at least one DL transmission after completing the UL TCI state switch

FIGURE 5

BEAM SWITCHING IN CELLULAR COMMUNICATION NETWORKS

FIELD

Various example embodiments relate in general to cellular communication networks and more specifically, to beam management in such networks.

BACKGROUND

Beam management may refer to a set of functionalities that can be used to enhance operation of beam-based wireless communication systems. Beam management may be used for example in various cellular communication networks, such as, in cellular communication networks operating according to 5G radio access technology. 5G radio access technology may also be referred to as New Radio, NR, access technology. 3rd Generation Partnership Project, 3GPP, develops standards for 5G/NR and one of the topics in the 3GPP discussions is related to beam management, comprising beam switching. According to the discussions there is a need to provide enhanced methods, apparatuses and computer programs related to beam switching in cellular communication networks. Such enhancements may also be beneficial in other wireless communication networks as well.

SUMMARY

According to some aspects, there is provided the subject-matter of the independent claims. Some example embodiments are defined in the dependent claims.

The scope of protection sought for various example embodiments of the disclosure is set out by the independent claims. The example embodiments and features, if any, described in this specification that do not fall under the scope of the independent claims are to be interpreted as examples useful for understanding various example embodiments of the disclosure.

According to a first aspect of the present disclosure, there is provided an apparatus comprising means for receiving, from a wireless network node, a Transmission Coordination Indication, TCI, state switch command, the TCI state switch command commanding the apparatus to perform at least an uplink TCI state switch, means for receiving, from the wireless network node, at least one downlink transmission before the uplink TCI state switch is required to be completed and means for transmitting, to the wireless network node, feedback information related to the at least one downlink transmission after completing the uplink TCI state switch. The apparatus of the first aspect may be a user equipment or a control device configured to control the functioning thereof, possibly when installed therein.

Example embodiments of the first aspect may comprise at least one feature from the following bulleted list or any combination of the following features:

the apparatus further comprises means for buffering said feedback information related to the at least one downlink transmission at least until the uplink TCI state switch is required to be completed;

wherein the TCI state switch command is a unified TCI state switch command commanding the apparatus to switch from a first downlink TCI state to a second downlink TCI state and from a first uplink TCI state to a second uplink TCI state;

the apparatus further comprises means for receiving, from the wireless network node, the at least one downlink transmission after completing the switch from the first downlink TCI state to the second downlink TCI state before the uplink TCI state switch is required to be completed;

wherein the apparatus is available to be scheduled to receive at least one downlink transmission starting from the completion of the switch from the first downlink TCI state to the second downlink TCI state;

wherein the TCI state switch command is a separate TCI state switch command commanding the apparatus to switch from a first uplink TCI state to a second uplink TCI state;

wherein the apparatus is available to be scheduled to receive at least one downlink transmission starting from a slot that is a feedback delay before the time to complete the uplink TCI state switch expires;

wherein the feedback delay is configured by the wireless network node using Radio Resource Control, RRC, signalling;

wherein said feedback information is Hybrid Automatic Repeat request, HARQ, information;

wherein the apparatus is a user equipment or a control device configured to control the operation of the user equipment.

According to a second aspect of the present disclosure, there is provided an apparatus comprising means for transmitting, to a user equipment, a Transmission Coordination Indication, TCI, state switch command, the TCI state switch command commanding the user equipment to perform at least an uplink TCI state switch; means for transmitting, to the user equipment, at least one downlink transmission before the uplink TCI state switch is required to be completed and means for receiving, from the user equipment, feedback information related to the at least one downlink transmission after completing the uplink TCI state switch. The apparatus of the second aspect may be a wireless network node or a control device configured to control the functioning thereof, possibly when installed therein.

According to a third aspect, there is provided a first method comprising, receiving by a user equipment, from a wireless network node, a Transmission Coordination Indication, TCI, state switch command, the TCI state switch command commanding the user equipment to perform at least an uplink TCI state switch, receiving by the user equipment, from the wireless network node, at least one downlink transmission before the uplink TCI state switch is required to be completed and transmitting by the user equipment, to the wireless network node, feedback information related to the at least one downlink transmission after completing the uplink TCI state switch. The first method may be performed by a user equipment or a control device configured to control the functioning thereof, possibly when installed therein.

According to a fourth aspect, there is provided a second method comprising, transmitting by a wireless network node, to a user equipment, a Transmission Coordination Indication, TCI, state switch command, the TCI state switch command commanding the user equipment to perform at least an uplink TCI state switch, transmitting by the wireless network node, to the user equipment, at least one downlink transmission before the uplink TCI state switch is required to be completed and receiving by the wireless network node, from the user equipment, feedback information related to the at least one downlink transmission after completing the uplink TCI state switch. The second method may be performed by a wireless network node or a control device configured to control the functioning thereof, possibly when installed therein.

According to a fifth aspect of the present disclosure, there is provided an apparatus comprising at least one processing core, at least one memory including computer program code, the at least one memory and the computer program code being configured to, with the at least one processing core, cause the apparatus at least to receive, from a wireless network node, a Transmission Coordination Indication, TCI, state switch command, the TCI state switch command commanding the apparatus to perform at least an uplink TCI state switch, receive, from the wireless network node, at least one downlink transmission before the uplink TCI state switch is required to be completed and transmit, to the wireless network node, feedback information related to the at least one downlink transmission after completing the uplink TCI state switch. The apparatus of the fifth aspect may be a user equipment or a control device configured to control the functioning thereof, possibly when installed therein.

Example embodiments of the fifth aspect may comprise at least one feature from the following bulleted list or any combination of the following features:

- wherein the at least one memory and the computer program code are further configured to, with the at least one processing core, cause the apparatus at least to buffer said feedback information related to the at least one downlink transmission at least until the uplink TCI state switch is required to be completed;
- wherein the TCI state switch command is a unified TCI state switch command commanding the apparatus to switch from a first downlink TCI state to a second downlink TCI state and from a first uplink TCI state to a second uplink TCI state;
- wherein the at least one memory and the computer program code are further configured to, with the at least one processing core, cause the apparatus at least to receive, from the wireless network node, the at least one downlink transmission after completing the switch from the first downlink TCI state to the second downlink TCI state before the uplink TCI state switch is required to be completed;
- wherein the apparatus is available to be scheduled to receive at least one downlink transmission starting from the completion of the switch from the first downlink TCI state to the second downlink TCI state;
- wherein the TCI state switch command is a separate TCI state switch command commanding the apparatus to switch from a first uplink TCI state to a second uplink TCI state;
- wherein the apparatus is available to be scheduled to receive at least one downlink transmission starting from a slot that is a feedback delay before the time to complete the uplink TCI state switch expires;
- wherein the feedback delay is configured by the wireless network node using Radio Resource Control, RRC, signalling;
- wherein said feedback information is Hybrid Automatic Repeat request, HARQ, information;
- wherein the apparatus is a user equipment or a control device configured to control the operation of the user equipment.

According to a sixth aspect of the present disclosure, there is provided an apparatus comprising at least one processing core, at least one memory including computer program code, the at least one memory and the computer program code being configured to, with the at least one processing core, cause the apparatus at least to transmit, to a user equipment, a Transmission Coordination Indication, TCI, state switch command, the TCI state switch command commanding the user equipment to perform at least an uplink TCI state switch, transmit, to the user equipment, at least one downlink transmission before the uplink TCI state switch is required to be completed and receive, from the user equipment, feedback information related to the at least one downlink transmission after completing the uplink TCI state switch. The apparatus of the second aspect may be a wireless network node or a control device configured to control the functioning thereof, possibly when installed therein.

According to a seventh aspect of the present disclosure, there is provided a non-transitory computer readable medium having stored thereon a set of computer readable instructions that, when executed by at least one processor, cause an apparatus to at least to perform the first method. According to an eighth aspect of the present disclosure, there is provided a non-transitory computer readable medium having stored thereon a set of computer readable instructions that, when executed by at least one processor, cause an apparatus to at least to perform the second method.

According to a ninth aspect of the present disclosure, there is provided a computer program comprising instructions which, when the program is executed by an apparatus, cause the apparatus to carry out the first method. According to a tenth aspect of the present disclosure, there is provided a computer program comprising instructions which, when the program is executed by an apparatus, cause the apparatus to carry out the second method.

BRIEF DESCRIPTION OF THE DRAWINGS

FIG. 5 illustrates a flow graph of a first method in accordance with at least some example embodiments.

EXAMPLE EMBODIMENTS

Beam management may be enhanced by the procedures described herein. More specifically, beam management may be enhanced by providing a way to perform switching more efficiently by enabling scheduling of Downlink, DL, transmissions while Uplink, UL, is unavailable due to the UL beam switch.

Figure 1:
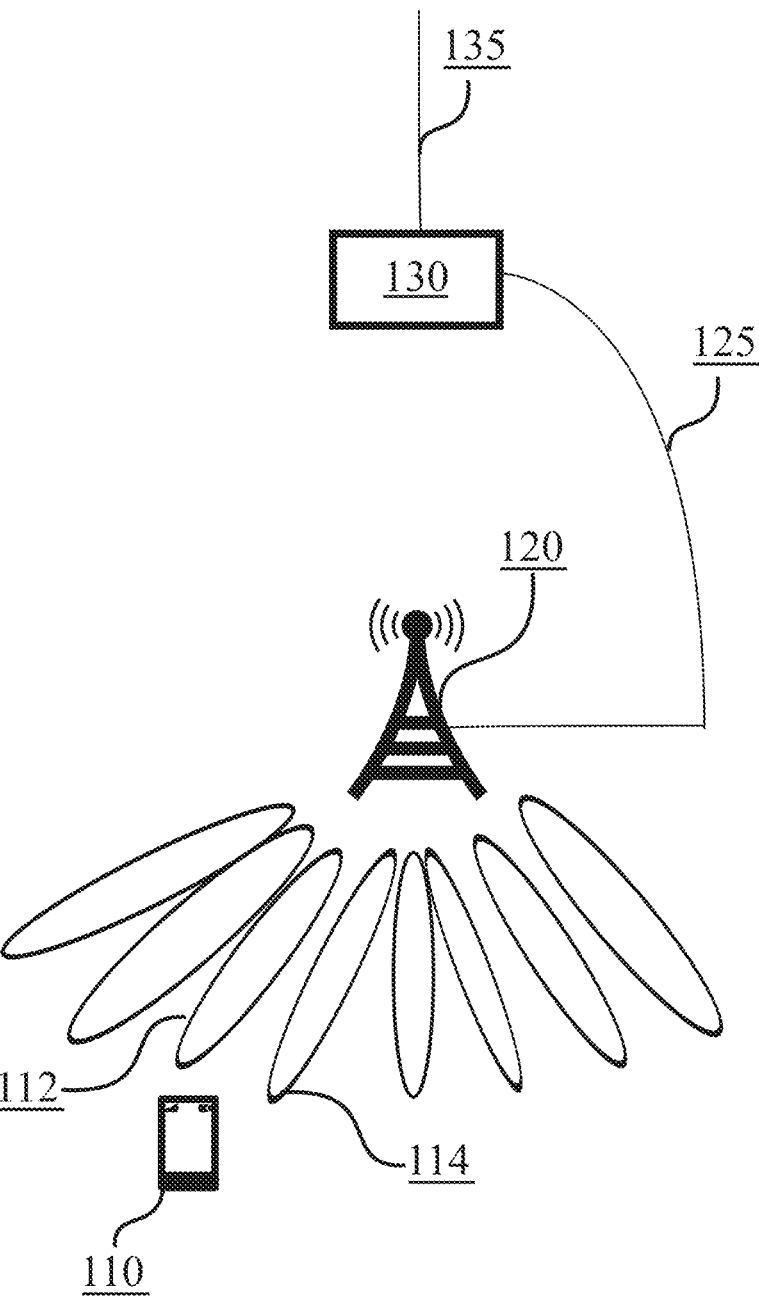
FIG. 1 illustrates an example of a network scenario in accordance with at least some example embodiments.

FIG. 1 illustrates an example of a network scenario in accordance with at least some example embodiments. According to the example scenario of FIG. 1, there may be a beam-based wireless communication system, which comprises UE 110, wireless network node 120 and core network element 130. UE 110 may be connected to wireless network node 120 via air interface using beams 112 and 114, either simultaneously or one at a time.

UE 110 may comprise, for example, a smartphone, a cellular phone, a Machine-to-Machine, M2M, node, Machine-Type Communications, MTC, node, an Internet of Things, IoT, node, a car telemetry unit, a laptop computer, a tablet computer or, indeed, any kind of suitable wireless terminal. In the example system of FIG. 1, UE 110 may communicate wirelessly with wireless network node 120 via beam 112 and/or beam 114. Wireless network node 120 may be considered as a serving node for UE 110 and one cell of wireless network node 120 may be a serving cell for UE 110.

Air interface between UE 110 and wireless network node 120 may be configured in accordance with a Radio Access Technology, RAT, which both UE 110 and wireless network node 120 are configured to support. Examples of cellular RATs include Long Term Evolution, LTE, New Radio, NR, which may also be known as fifth generation, 5G, radio access technology and MulteFire.

For example in the context of LTE, wireless network node 120 may be referred to as eNB while wireless network node 120 may be referred to as gNB in the context of NR. In some example embodiments, wireless network node 120 may be referred to as a Transmission and Reception Point, TRP, or control multiple TRPs that may be co-located or non-co-located. In any case, example embodiments of the present disclosure are not restricted to any particular wireless technology. Instead, example embodiments may be exploited in any beam-based wireless communication system, wherein beam switching needs to be performed.

Wireless network node 120 may be connected, directly or via at least one intermediate node, with core network 130 via interface 125. Core network 130 may be, in turn, coupled via interface 135 with another network (not shown in FIG. 1), via which connectivity to further networks may be obtained, for example via a worldwide interconnection network. Wireless network node 120 may be connected, directly or via at least one intermediate node, with core network 130 or with another core network.

In some example embodiments, the network scenario may comprise a relay node instead of, or in addition to, UE 110 and/or wireless network node 120. Relaying may be used for example when operating on millimeter-wave frequencies. One example of the relay node may be an Integrated Access and Backhaul, IAB, node. The IAB node may be referred to as a self-backhauling relay as well. Another example of a relay may be an out-band relay. In general, the relay node may comprise two parts:

1) Distributed Unit, DU, part which may facilitate functionalities of wireless network node 120, such as a gNB. Thus, in some example embodiments, the DU part of a relay may be referred to as wireless network node 120 and the DU may perform tasks of wireless network node 120;

2) Mobile Termination, MT, part which may facilitate functionalities of UE 110, i.e., a backhaul link which may be the communication link between a parent node (DU), such as a DU part of wireless network node 120, and the relay, such as an IAB node. In some example embodiments, the MT part may be referred to as UE 110 and perform tasks of UE 110.

Quasi Co-Location, QCL, indication functionality may be exploited for beam management. Two antenna ports may be considered as QCL'ed if properties of a channel over which a symbol is transmitted via a first antenna port can be derived from channel over which a symbol is transmitted via a second antenna port. Regarding downlink beam indication, QCL indication functionality may be defined as follows. The principle to receive a certain physical signal or physical channel may be that UE 110 is either configured with, or UE 110 implicitly determines, a source/reference Reference Signal, RS, that UE 110 has received and measured earlier which defines how to set a receive beam of UE 110 for the reception of the downlink (target) physical signal or channel to be received. To provide UE 110 with QCL characteristics for the target signal (to be received) a Transmission Configuration Indicator, TCI, framework may be used.

According to the TCI framework, UE 110 may be configured with TCI state(s) to provide UE 110 with source RS(s) for determining QCL characteristics. Each TCI state may include for example one or two source RSs that provide QCL TypeA, TypeB, TypeC and/or TypeD parameters to UE 110, e.g., as follows:

QCL-TypeA: {Doppler shift, Doppler spread, average delay, delay spread}

QCL-TypeB: {Doppler shift, Doppler spread}

QCL-TypeC: {Doppler shift, average delay}

QCL-TypeD: {Spatial Rx parameter}

Example embodiments of the present disclosure provide enhancements for UL TCI state switching using a separate UL TCI state switch or a unified TCI state switch. Example embodiments of the present disclosure may be exploited, e.g., for further enhanced Multiple Input Multiple Output, feMIMO.

3GPP Technical Specification Group, TSG, RAN 4 has reached the following agreement in GTW in RAN4 #101bis-e regarding the unified, i.e., joint TCI state switch:

No extra requirement is needed for the joint TCI mode, DL and UL requirements may be applicable independently;

Note: it may not be expected that UE 110 would be required to make a DL reception or an UL transmission before UE 110 completes the DL or UL TCI state switching, respectively.

Even though it is stated from the agreement that the requirements can be applicable independently, it may be argued that the agreement is not clear enough. There is therefore a need to further clarify the operation, e.g., by further clarifying the following wordings:

In 3GPP TS 38.133, for DL TCI state switching: In case of joint TCI state switch, UE is not expected to receive on DL before UE completes the DL and UL TCI state switch;

In 3GPP 38.133, for UL TCI state switching: In case of joint TCI state switch, UE is not expected to transmit on UL before UE completes the DL and UL TCI state switch.

The problem with such operation is that the UL TCI state switching and the DL TCI state switching delay requirements are different, and the UL TCI state switching takes longer than the DL TCI state switching, possibly depending on whether the DL/UL TCI state switch is known or unknown.

Thus, there would potentially be a long time in which UE 110 could not be scheduled in the DL because the TCI state switch in the UL would not be ready yet, and UE 110 would need to wait for the UL TCI state switch to be completed before it could receive DL transmissions.

Example values for UL and DL TCI state switch delays are shown in Table 1 below, when $T_{HARQ}=8$ slots, $N_{slot}^{subframe,\mu}=8$, $T_{first\text{-}SSB}$, $T_{first\_target\text{-}PL\text{-}RS}$, $T_{target\_PL\text{-}RS}$, $T_{L1\text{-}RSPR\_Measurement\_Period\_SSB}=20$ ms (one example, but may be used as a base assumption of Synchronization Signal Block, SSB, periodicity in NR cells in 3GPP TSG RAN4), $NR\__{slot\_length}=125$ μs.

TABLE 1

| Example values for UL and DL TCI state switch delays | | | |
| --- | --- | --- | --- |
| | Target TCI state | PL-RS | TCI state switch delay [ms] |
| DL | Known | — | 4 |
| | Unknown | — | 26 |
| UL | Known | Maintained | 4 |
| | Known | Not maintained | 106 |
| | Unknown | — | 126 |

Therefore, for example in the case in which the target DL TCI state is known and the target UL TCI state is unknown, UE 110 could not be scheduled in the DL for 126 ms after receiving a unified TCI state switch command, commanding UE 110 to perform a DL TCI state switch and an UL state switch, even though the DL would be ready for reception 4 ms after UE 110 receives the unified TCI state switch command.

A DL TCI state switch delay of 126 ms would be a significant delay for a TCI state change (i.e., for beam switch) at least in NR and the delay is comparable to what can be assumed for normal handover delay, which can be 52 ms in Frequency Range, FR, 2-1 if a target cell is known.

If UE 110 would be only be scheduled in both DL and UL once the TCI switch is completed for both, UL and DL directions, there would be a large mismatch between UL and DL TCI state switch delays. In such a case UE 110 could not be scheduled for a long period in either of the direction. Such a solution would have clear disadvantages. For instance, it would prevent UE 110 to receive data in DL for as much as 100 ms if the pediocity of SSB would be 20 ms, even though UE 110 would be ready for receiving in principle already the DL TCI state switch is completed.

An alternative solution was proposed in 3GPP documents R4-2213939, where it was proposed that the old UL TCI state can be used for sending Hybrid Automatic Repeat request, HARQ, feedback. However, such a solution would cause additional implementation challenges for UE 110 and network implementation, because the network cannot know exactly the moment when UE 110 switches from the old TCI state to the new TCI state and the UE may not transmit in the old TCI state while switching to the new TCI state.

Example embodiments of the present disclosure therefore consider the problem of unequal delay between UL and DL TCI state switching. UE 110 first receive a TCI state switch command, like a unified TCI switch command or a separate TCI switch command for UL, commanding UE 110 to perform at least an UL TCI state switch. The unified TCI switch command may be used to command UE 110 to perform both, a DL TCI state switch and an UL TCI state switch, and the separate TCI switch command for UL may be used to command UE 110 to perform the UL TCI state switch only, but not the DL TCI state switch. TCI switch command may sometimes be referred to as TCI state switch command.

UE 110 may then receive, from wireless network node 120, at least one DL transmission while a time to complete the UL TCI state switch has not yet expired. Hence, scheduling of DL data while UL is still unavailable is enabled when the UL TCI state switch takes longer than the DL TCI state switch. Time to complete the UL TCI state switch may be, for example, indicated in milliseconds (ms) as shown in Table 1. Similar indication may be used for indicating time to complete the DL TCI state switch. However, as said, these requirements may be different for UL TCI state switch and DL TCI state switch. Time to complete the UL TCI state switch may sometimes be referred to as UL TCI state switch delay requirement. Thus, the UE 110 may be available to receive, from wireless network node 120, at least one DL transmission while the UL TCI state switch delay requirement has not been exceeded. For instance, UL TCI state switch delay requirement may take the form of a certain time or time value, such as 106 or 126 ms (see Table 1). Thus, before said time or time value has passed, UE 110 may be available to receive the at least one DL transmission according to the DL TCI state. Thus, UE 110 may be available to receive at least one DL transmission before the UL state switch is required to be completed (e.g. within said time from receiving or decoding the TCI state switch command, such as within 106 or 126 ms from receiving or decoding the TCI state switch command).

UE 110 may for example receive the at least one DL transmission while the UL TCI state switch has not yet completed. UE 110 may for example have a certain time requirement before which the uplink TCI state switch needs to be performed. This time requirement may be referred to as time to complete the UL TCI state switch, i.e., a time period from receiving and/or decoding the TCI state switch command to a time instance at which the UL TCI state switch needs to be complete.

It may be possible that UE 110 performs the UL TCI state switch before the time period is over, but using said certain time period enables the network, i.e., wireless network node 120, reliably know or determine when UE 110 is, at minimum, able to use the new UL TCI state switch indicated by the UL TCI state switch command. This time period may be controlled using, for example, a timer, like UL TCI state switch timer. That is, the timer may be initiated or started (may also be referred to as triggering the timer) based on receiving or decoding the UL TCI state switch command and may expire after certain time.

For example, UE 110 may complete the UL TCI state switch before the timer expires. Thus, after the timer expires or upon the timer expires, UE 110 may have performed the UL TCI state switch and may operate according to the new UL TCI state.

As a further example, when the TCI state switch command indicates change of both UL and DL TCI state, it is noted that the at least one DL transmission before the UL TCI state switch is to be received according to the switched (can be referred to also as new) DL TCI state. Thus, the at least one DL transmission may be received after the DL TCI state switch is required to be completed.

As used herein, UE 110 being available to receive the at least one DL transmission may mean that the UE 110 is able to receive one or more DL transmissions from the network, such as from wireless network node 120, according to the DL TCI state. So, the network may schedule one or more DL transmissions for UE 110 and transmit the one or more DL transmissions to UE 110 according to scheduled resources. Before the current solution, network could not schedule DL transmission(s) to UE 110 before the UL TCI state switch was required to be completed. The present solution enables UE 110 to receive DL transmission(s) before the UL TCI state switch is required to be completed when TCI state switch command has been received and UL state switch procedure is initiated and possibly still ongoing. That is, UE 110 may be available to be scheduled to receive at least one downlink transmission before the UL TCI state switch is required to be completed. Available herein may mean that UE 110 is able to receive DL transmission(s), such as Physical DL Shared Channel, PDSCH, transmission(s), according to scheduling by the network. Availability may be understood broadly to mean that it is possible to try to schedule DL transmission(s) to UE 110 by the network.

However, in an embodiment, wireless network node 120 may schedule the at least one DL transmission to UE 110. UE 110 may receive the scheduling and receive, based on the scheduling, the at least one DL transmission after receiving the TCI state switch command but before the UL TCI state switch is required to be completed. In an embodiment, this means that UE 110 may receive, based on the scheduling, the at least one DL transmission after receiving the TCI state switch command but before the UL TCI state switch is completed. The slot(s) in which such DL transmission(s) may be scheduled and received are indicated below with further examples.

Figure 2:
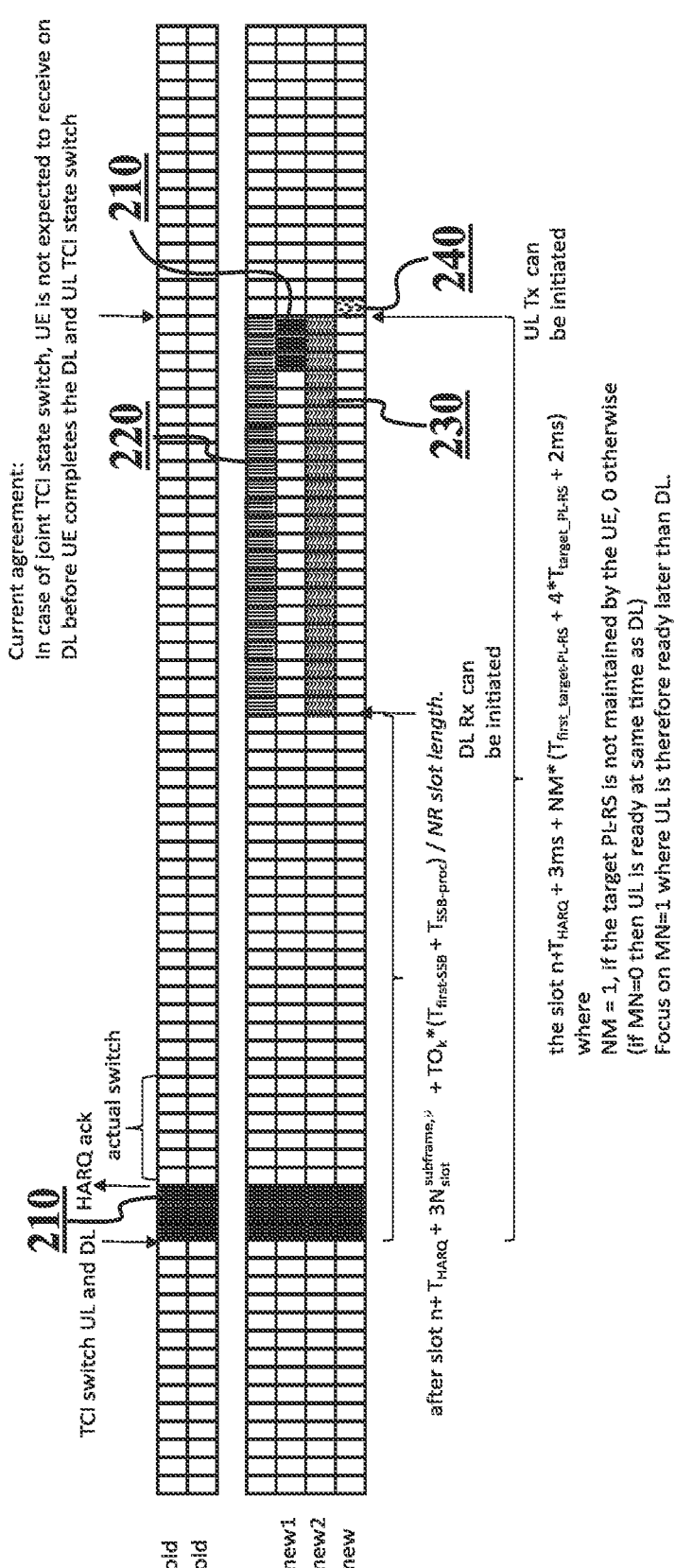
FIG. 2 illustrates different operation options in accordance with at least some example embodiments.

FIG. 2 illustrates different operation options in accordance with at least some example embodiments. In FIG. 2, "DL old" is the old DL TCI state, "UL old" is the old UL TCI state, "DL" is the new DL TCI state according to the prior art, "DL new1" is the new DL TCI state according to the first solution, and "DL new2" is the new DL TCI state according to the second solution, and "UL new" is the new UL TCI state. Furthermore, HARQ feedback delay is denoted by 210, during which UE 110 may be scheduled in DL and send HARQ, possibly without any additional changes in specifications. During slots denoted by 220, UE 110 cannot be scheduled according to the current agreements. During slots denoted by 230, UE 110 may be configured to buffer all HARQ feedback from DL transmission during the time until the HARQ feedback can be transmitted. During the slot denoted by 240, UE 110 may transmit HARQ feedback (either existing or newly configured buffered HARQ bunch).

FIG. 2 illustrates a solution, wherein UE 110 is not expected, i.e., configured to be available, to receive on DL before UE 110 completed the DL and UL state switch in case of a joint, i.e., unified TCI state switch. "DL" illustrates a solution, wherein UE 110 could not be scheduled according to current 3GPP agreement and slots 220 cannot be used for DL because UL TCI state is not completed.

"DL new1" illustrates a solution, wherein last slots during UL unavailability period, i.e., last slots before the UL TCI state switch, may be used. In case of such a solution, wireless network node 120, like a gNB, may use knowledge about a feedback delay, such as a HARQ delay ($T_{HARQ}$) in combination with the UL TCI state switch delay $T_{UL\ TCI}$. In this solution, if UE 110 receives the TCI state switch command at slot n, UE 110 may already receive DL data at slot n+$T_{UL\ TCI}$−$T_{HARQ}$. After receiving the DL data, UE 110 may send feedback information related to the received DL data, like HARQ feedback, as soon as the UL TCI state is available using the existing HARQ signalling. That is, UE 110 may transmit feedback information related to the at least one DL transmission after the time to complete the UL TCI state switch has expired (i.e., after the UL TCI state switch is required to be completed). As said, by that time the UL TCI state switch is completed by UE 110.

UE 110 may thus be configured to be available to receive the at least one DL transmission starting from a slot that is a feedback delay ($T_{HARQ}$) before the time to complete the UL TCI state switch (n+$T_{UL\ TCI}$) expires, but not in slots before this slot. That is, UE 110 may listen, i.e., monitor for scheduling messages from wireless network node 120 starting from the slot that is the feedback delay before the time to complete the UL TCI state switch expires. UE 110 may for example monitor Physical DL Control Channel, PDCCH, and receive on PDSCH.

In general, UE 110 may be available to receive the at least one DL transmission starting from a slot that is a feedback delay before the time to complete the UL TCI state switch expires.

The solution "DL new1" therefore provides an advantage, because it allows the DL to be scheduled before the time when UE 110 may transmit in UL, taking into account the feedback delay, like HARQ feedback delay. The feedback delay may be configured by wireless network node 120, e.g., using Radio Resource Control, RRC, signalling. For instance, the feedback delay may be configured by a RRC parameter dl-DataToUL-ACK, as defined in 3GPP TS 38.331, which may take up to 8 slots if Subcarrier Spacing, SCS, is less than 480 kHz. In that case the last dl-DataToUL-ACK<=8 slots of UL TCI state switching delay would be available for DL reception by UE 110.

"DL new 2" illustrates a solution, wherein UE 110 may receive, from wireless network node 120, the at least one DL transmission after completing a switch from a first DL TCI state to a second DL TCI state while the time to complete the UL TCI state switch from a first UL TCI state to a second UL TCI state has not yet expired. In case of "DL new 2", HARQ feedback buffering may be performed by UE 110 during UL unavailability.

That is, UE 110 may be scheduled in DL as soon as the DL TCI state switch is completed, and UE 110 may buffer the feedback information, like HARQ feedback(s), related to the at least one DL transmission at least until the UL TCI state switch has been completed. So UE 110 may not transmit due to lack of UL and UE 110 may delay the transmission of said feedback information until the UL TCI state switch is completed by UE 110.

In the solution illustrated as "DL new 2", the full time where the DL TCI is available and UL TCI is not available may be used for receiving DL data, and said feedback information may be transmitted as soon as the UL TCI switch is ready. The solution "DL new2" therefore provides advantages, because it allows the use of the entire period where the UL is unavailable. In that case the full 125 ms calculated above may be used for DL transmission, while in the solution illustrated as "DL new1" only 8 slots may be used, for example.

Both solutions, "DL new1" and "DL new2", may be applied and introduced in a flexible serial manner. In both solutions, in case of a unified TCI state switch UE 110 may receive the at least one DL transmission, like DL data, after completing the DL TCI state switch while a time to complete the UL TCI state switch has not yet expired, and transmit to wireless network node 120 feedback information related to the at least one DL transmission after the time to complete the UL TCI state switch has expired and the UL TCI state switch is completed. UE 110 may also buffer said feedback information at least until the UL TCI state switch has been completed. In both solutions, in case of a separate TCI state switch for UL UE 110 may receive the at least one DL transmission while the time to complete the UL TCI state switch has not yet expired, and also transmit to wireless network node 120 said feedback information related to the at least one DL transmission after the time to complete the UL TCI state switch has expired and the UL TCI state switch is completed.

Figure 3:
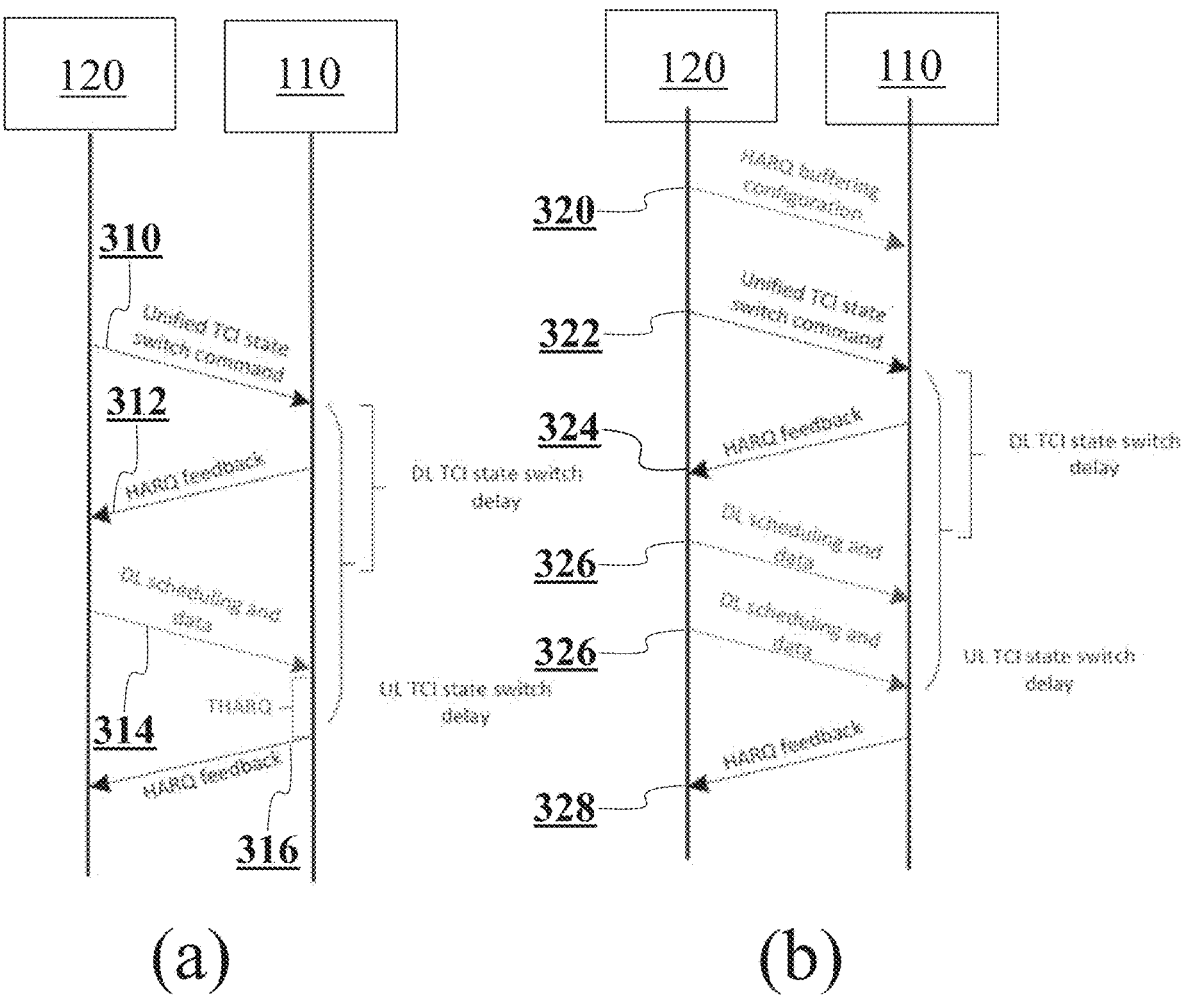
FIG. 3 illustrates signaling graphs in accordance with at least some example embodiments.

FIG. 3 illustrates signaling graphs in accordance with at least some example embodiments. More specifically, FIG. 3(*a*) illustrates a signalling graph for the solution "DL new1" shown in FIG. 2 and FIG. 3(*a*) illustrates a signalling graph for the solution "DL new2" shown in FIG. 2.

In FIG. 3(*a*), wireless network node 120 may transmit, at step 310, a unified TCI state switch command to UE 110. The DL TCI state switch and UL TCI state switch delays may start from the reception of the unified TCI state switch command at UE 110. At step 312, UE 110 may transmit feedback information, like HARQ feedback, to UE 110.

After exceeding the DL TCI state switch delay and completing the DL TCI state switch, wireless network node 120 may transmit, at step 314, at least one DL transmission, like DL scheduling and data, to UE 110 even though the UL TCI state switch delay requirement has not been exceeded. That is, a time to complete the UL TCI state switch has not yet expired and the UL TCI state switch has not been completed. UE 110 must be available and may be scheduled to receive the at least one DL transmission starting from a slot that is a feedback delay ($T_{HARQ}$) before the time to complete the UL TCI state switch ($n+T_{UL\_TCI}$) expires, i.e. at slot $n+T_{UL\_TCI}-T_{HARQ}$, but no in slots before this slot. That is, UE 110 may be scheduled $T_{HARQ}$ slots before the UL TCI state switch is completed. UE 110 may then, at step 316, transmit to wireless network node 120 feedback information, like HARQ feedback, related to the at least one DL transmission after completing the UL TCI state switch and exceeding the UL TCI state switch delay.

In FIG. 3(*b*), wireless network node 120 may, in some example embodiments, transmit a buffering configuration, like HARQ buffering configuration to UE 110 at step 320. Steps 322 and 324 may correspond to steps 310 and 312, respectively.

After exceeding the DL TCI state switch delay and completing the DL TCI state switch, wireless network node 120 may transmit, at steps 326, at least one DL transmission, like DL scheduling and data, to UE 110 even though the UL TCI state switch delay requirement has not been exceeded. That is, a time to complete the UL TCI state switch has not yet expired and the UL TCI state switch has not been completed. UE 110 may be scheduled to be available to receive at least one DL transmission starting from the completion of the DL TCI state switch, i.e., a switch from the first DL TCI state to a second DL TCI state switch. That is, UE 110 may be scheduled to receive in the DL, right after the DL TCI state switch is completed, thereby leading to reducing the time during which UE 110 cannot be scheduled in the DL. Step 328 may then correspond to step 316.

Embodiments of the present disclosure may be applied similarly for a separate TCI state switch for UL, in which case the TCI state switch command may be a separate TCI state switch command commanding UE 110 to switch from a first UL TCI state to a second UL TCI state, but a DL TCI state switch would not be required.

In some example embodiments, the solution "DL new1" illustrated in FIGS. 2 and 3(*a*) may be implemented without need for additional signaling, only with appropriate description of the TCI switching delay. For instance, the solution "DL new1" may be realized with the following example:

8.15.3 MAC-CE Based Downlink TCI State Switch Delay
The requirements in this clause shall apply for DL TCI state switch using separate DL TCI state or joint TCI state of unified TCI state switch framework.
In case that source RS in DL TCI state or joint TCI state is associated with a PCI different from that of the serving cell, the requirements in this clause shall apply if the cell with different PCI satisfies the known cell condition defined in 8.15.1. If the known cell condition is not met, longer delay may be expected.

[In case of joint TCI state switch, UE is not expected to receive on DL before UE completes the DL and UL TCI state switch.

In case of joint TCI state switch, if the delays for DL and UL TCI state switch are different, the UE is shall be ready expected to receive on DL, $T_{HARQ}$ slots before the UE completes the UL TCI state switch.
]
If the target TCI state is known, upon receiving PDSCH carrying MAC-CE activation command in slot n, UE shall be able to receive UE-dedicated PDCCH/PDSCH with target TCI state of the serving cell on which TCI state switch occurs at the first slot that is after slot $n+T_{HARQ}+3N_{slot}^{subframe,\ \mu}+TO_k*(T_{first\text{-}SSB}+T_{SSB\text{-}proc})$/NR slot length. The UE shall be able to receive UE-dedicated PDCCH/PDSCH with the old TCI state until slot $n+T_{HARQ}+3N_{slot}^{subframe,\ \mu}$. Where $T_{HARQ}$ is the timing between DL data transmission and acknowledgement as specified in TS 38.213 [3];

$T_{first\text{-}SSB}$ is time to first SSB transmission after MAC CE command is decoded by the UE; The SSB shall be the QCL-TypeA or QCL-TypeC to target TCI state
$T_{SSB\text{-}proc}$=2 ms;
$TO_k$=1 if target TCI state is not in the active TCI state list for PDSCH/PDCCH, 0 otherwise.
( . . . )
8.16.3 MAC-CE Based Uplink TCI State Switch Delay
The requirements in this clause shall apply for UL TCI state switch using separate UL TCI state or joint TCI state of unified TCI state switch framework.
In case that source RS in UL TCI state or joint TCI state is associated with a PCI different from that of the serving cell, the requirements in this clause shall apply if the cell with different PCI satisfies the known cell condition defined in 8.16.1. If the known cell condition is not met, longer delay may be expected.
UE is not expected to transmit on UL before UE completes UL TCI state switch.]
For separate UL TCI state switch or joint TCI state switch for PUCCH or PUSCH, or semi-persistent/aperiodic/periodic SRS, when beamCorrespondenceWithoutUL-Beam-Sweeping is set to 1, upon receiving PDSCH carrying MAC-CE activation command in slot n on serving cell,
If target TCI state is known,
The UE shall be able to transmit uplink signal with the target TCI state in the slot $n+T_{HARQ}+3$ ms+NM*$(T_{first\_target\text{-}PL\text{-}RS}+4*T_{target\_PL\text{-}RS}+2$ ms).
If target TCI state is unknown,
The UE shall be able to transmit uplink signal with the target TCI state in the slot $n+T_{HARQ}+3$ ms+$T_{L1\text{-}RSRP}+T_{first\_target\text{-}PL\text{-}RS}+4*T_{target\_PL\text{-}RS}+2$ ms.

In some example embodiments, the solution "DL new2" illustrated in FIGS. 2 and 3(*b*) may be implemented in 3GPP specifications by TSG RAN1, TSG RAN2 and TSG RAN4 as follows:
  RAN1 spec may include the additional delay for HARQ transmission in 38.213, session 9.2.3;
  RAN2 may or may not include a parameter for activating/deactivating the delayed HARQ feature during joint TCI state switching;
  RAN4 may describes the UE behavior that it may be scheduled in DL as soon as the DL TCI switch is completed.

For instance, the solution "DL new2" may be realized with the following example:
8.15.3 MAC-CE Based Downlink TCI State Switch Delay
The requirements in this clause shall apply for DL TCI state switch using separate DL TCI state or joint TCI state of unified TCI state switch framework.

In case that source RS in DL TCI state or joint TCI state is associated with a PCI different from that of the serving cell, the requirements in this clause shall apply if the cell with different PCI satisfies the known cell condition defined in 8.15.1. If the known cell condition is not met, longer delay may be expected.

[In case of joint TCI state switch, ~~UE is not expected to receive~~ on DL before UE completes ~~the DL and UL TCI state switch.~~]

In case of joint TCI state switch, the UE is expected to receive on DL when it completes the DL TCI state switch, if configured with HARQ feedback buffering as described in TS 38.213. Otherwise, UE is expected to be able to receive on DL THARQ slots before the UE completes the UL TCI state switch.

If the target TCI state is known, upon receiving PDSCH carrying MAC-CE activation command in slot n, UE shall be able to receive UE-dedicated PDCCH/PDSCH with target TCI state of the serving cell on which TCI state switch occurs at the first slot that is after slot $n+T_{HARQ}+3N_{slot}^{subframe,\mu}+TO_k*(T_{first-SSB}+T_{SSB-proc})/NR$ slot length. The UE shall be able to receive UE-dedicated PDCCH/PDSCH with the old TCI state until slot $n+T_{HARQ}+3N_{slot}^{subframe,\mu}$.

Where $T_{HARQ}$ is the timing between DL data transmission and acknowledgement as specified in TS 38.213 [3];

$T_{first-SSB}$ is time to first SSB transmission after MAC CE command is decoded by the UE; The SSB shall be the QCL-TypeA or QCL-TypeC to target TCI state $T_{SSB-proc}=2$ ms;

$TO_k=1$ if target TCI state is not in the active TCI state list for PDSCH/PDCCH, 0 otherwise.

( . . . )

8.16.3 MAC-CE Based Uplink TCI State Switch Delay

The requirements in this clause shall apply for UL TCI state switch using separate UL TCI state or joint TCI state of unified TCI state switch framework.

In case that source RS in UL TCI state or joint TCI state is associated with a PCI different from that of the serving cell, the requirements in this clause shall apply if the cell with different PCI satisfies the known cell condition defined in 8.16.1. If the known cell condition is not met, longer delay may be expected.

[~~In case of joint TCI state switch,~~ The UE is not expected to transmit on UL before the UE completes the DL and UL TCI state switch.]

For separate UL TCI state switch or joint TCI state switch for PUCCH or PUSCH, or semi-persistent/aperiodic/periodic SRS, when beamCorrespondenceWithoutUL-Beam-Sweeping is set to 1, upon receiving PDSCH carrying MAC-CE activation command in slot n on serving cell, If target TCI state is known, The UE shall be able to transmit uplink signal with the target TCI state in the slot $n+T_{HARQ}+3$ ms+NM* $(T_{first\_target-PL-RS}+4*T_{target\_PL-RS}+2$ ms).

If target TCI state is unknown,

The UE shall be able to transmit uplink signal with the target TCI state in the slot $n+T_{HARQ}+3$ ms+$T_{L1-RSRP}+T_{first\_target-PL-RS}+4*T_{target\_PL-RS}+2$ ms.

Figure 4:
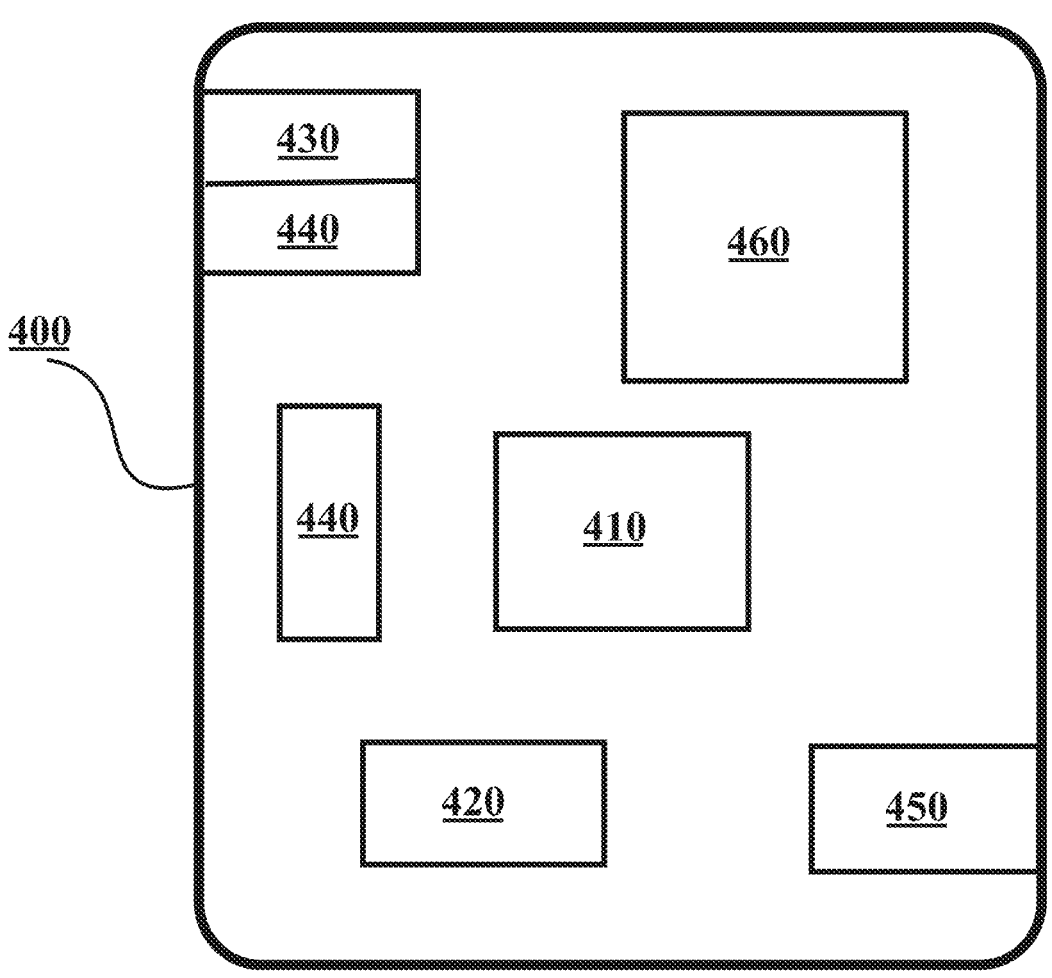
FIG. 4 illustrates an example apparatus capable of supporting at least some example embodiments.

FIG. 4 illustrates an example apparatus capable of supporting at least some example embodiments. Illustrated is device 400, which may comprise, for example, UE 110 or wireless network node 120, or a control device configured to control the functioning thereof, possibly when installed therein. Comprised in device 400 is processor 410, which may comprise, for example, a single- or multi-core processor wherein a single-core processor comprises one processing core and a multi-core processor comprises more than one processing core. Processor 410 may comprise, in general, a control device. Processor 410 may comprise more than one processor. Processor 410 may be a control device. A processing core may comprise, for example, a Cortex-A8 processing core manufactured by ARM Holdings or a Steamroller processing core produced by Advanced Micro Devices Corporation. Processor 410 may comprise at least one Qualcomm Snapdragon and/or Intel Atom processor. Processor 410 may comprise at least one application-specific integrated circuit, ASIC. Processor 410 may comprise at least one field-programmable gate array, FPGA. Processor 410 may be means for performing method steps in device 400. Processor 410 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 400 may comprise memory 420. Memory 420 may comprise random-access memory and/or permanent memory. Memory 420 may comprise at least one RAM chip. Memory 420 may comprise solid-state, magnetic, optical and/or holographic memory, for example. Memory 420 may be at least in part accessible to processor 410. Memory 420 may be at least in part comprised in processor 410. Memory 420 may be means for storing information. Memory 420 may comprise computer instructions that processor 410 is configured to execute. When computer instructions configured to cause processor 410 to perform certain actions are stored in memory 420, and device 400 overall is configured to run under the direction of processor 410 using computer instructions from memory 420, processor 410 and/or its at least one processing core may be considered to be configured to perform said certain actions. Memory 420 may be at least in part comprised in processor 410. Memory 420 may be at least in part external to device 400 but accessible to device 400.

Device 400 may comprise a transmitter 430. Device 400 may comprise a receiver 440. Transmitter 430 and receiver 440 may be configured to transmit and receive, respectively, information in accordance with at least one cellular or non-cellular standard. Transmitter 430 may comprise more than one transmitter. Receiver 440 may comprise more than one receiver. Transmitter 430 and/or receiver 440 may be configured to operate in accordance with Global System for Mobile communication, GSM, Wideband Code Division Multiple Access, WCDMA, Long Term Evolution, LTE, and/or 5G/NR standards, for example.

Device 400 may comprise a Near-Field Communication, NFC, transceiver 450. NFC transceiver 450 may support at least one NFC technology, such as Bluetooth, Wibree or similar technologies.

Device 400 may comprise User Interface, UI, 460. UI 460 may comprise at least one of a display, a keyboard, a touchscreen, a vibrator arranged to signal to a user by causing device 400 to vibrate, a speaker and a microphone. A user may be able to operate device 400 via UI 460, for example to accept incoming telephone calls, to originate telephone calls or video calls, to browse the Internet, to manage digital files stored in memory 420 or on a cloud accessible via transmitter 430 and receiver 440, or via NFC transceiver 450, and/or to play games.

Device 400 may comprise or be arranged to accept a user identity module 470. User identity module 470 may comprise, for example, a Subscriber Identity Module, SIM, card installable in device 400. A user identity module 470 may comprise information identifying a subscription of a user of device 400. A user identity module 470 may comprise cryptographic information usable to verify the identity of a user of device 400 and/or to facilitate encryption of communicated information and billing of the user of device 400 for communication effected via device 400.

Processor 410 may be furnished with a transmitter arranged to output information from processor 410, via electrical leads internal to device 400, to other devices comprised in device 400. Such a transmitter may comprise a serial bus transmitter arranged to, for example, output information via at least one electrical lead to memory 420 for storage therein. Alternatively to a serial bus, the transmitter may comprise a parallel bus transmitter. Likewise processor 410 may comprise a receiver arranged to receive information in processor 410, via electrical leads internal to device 400, from other devices comprised in device 400. Such a receiver may comprise a serial bus receiver arranged to, for example, receive information via at least one electrical lead from receiver 440 for processing in processor 410. Alternatively to a serial bus, the receiver may comprise a parallel bus receiver.

Device 400 may comprise further devices not illustrated in FIG. 4. For example, where device 400 comprises a smartphone, it may comprise at least one digital camera. Some devices 400 may comprise a back-facing camera and a front-facing camera, wherein the back-facing camera may be intended for digital photography and the front-facing camera for video telephony. Device 400 may comprise a fingerprint sensor arranged to authenticate, at least in part, a user of device 400. In some example embodiments, device 400 lacks at least one device described above. For example, some devices 400 may lack a NFC transceiver 450 and/or user identity module 470.

Processor 410, memory 420, transmitter 430, receiver 440, NFC transceiver 450, UI 460 and/or user identity module 470 may be interconnected by electrical leads internal to device 400 in a multitude of different ways. For example, each of the aforementioned devices may be separately connected to a master bus internal to device 400, to allow for the devices to exchange information. However, as the skilled person will appreciate, this is only one example and depending on the example embodiment various ways of interconnecting at least two of the aforementioned devices may be selected without departing from the scope of the example embodiments.

FIG. 5 is a flow graph of a first method in accordance with at least some example embodiments. The phases of the illustrated first method may be performed by UE 110 or by a control device configured to control the functioning thereof, possibly when installed therein.

The first method may comprise, at step 510, receiving by a user equipment, from a wireless network node, a Transmission Coordination Indication, TCI, state switch command, the TCI state switch command commanding the user equipment to perform at least an uplink TCI state switch. The first method may also comprise, at step 520, receiving by the user equipment, from the wireless network node, at least one downlink transmission before the uplink TCI state switch is required to be completed. Finally, the first method may comprise, at step 530, transmitting by the user equipment, to the wireless network node, feedback information related to the at least one downlink transmission after completing the uplink TCI state switch.

It is to be understood that the example embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular example embodiments only and is not intended to be limiting.

Reference throughout this specification to one example embodiment or an example embodiment means that a particular feature, structure, or characteristic described in connection with the example embodiment is included in at least one example embodiment. Thus, appearances of the phrases "in one example embodiment" or "in an example embodiment" in various places throughout this specification are not necessarily all referring to the same example embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various example embodiments and examples may be referred to herein along with alternatives for the various components thereof. It is understood that such example embodiments, examples, and alternatives are not to be construed as de facto equivalents of one another, but are to be considered as separate and autonomous representations.

In an example embodiment, an apparatus, such as, for example, UE 110 or wireless network node 120, may comprise means for carrying out the example embodiments described above and any combination thereof.

In an example embodiment, a computer program may be configured to cause a method in accordance with the example embodiments described above and any combination thereof. In an example embodiment, a computer program product, embodied on a non-transitory computer readable medium, may be configured to control a processor to perform a process comprising the example embodiments described above and any combination thereof.

In an example embodiment, an apparatus, such as, for example, UE 110 or wireless network node 120, may comprise at least one processor, and at least one memory including computer program code, wherein the at least one memory and the computer program code are configured to, with the at least one processor, cause the apparatus at least to perform the example embodiments described above and any combination thereof.

Furthermore, the described features, structures, or characteristics may be combined in any suitable manner in one or more example embodiments. In the preceding description, numerous specific details are provided, such as examples of lengths, widths, shapes, etc., to provide a thorough understanding of example embodiments of the disclosure. One skilled in the relevant art will recognize, however, that the disclosure can be practiced without one or more of the specific details, or with other methods, components, materials, etc. In other instances, well-known structures, materials, or operations are not shown or described in detail to avoid obscuring aspects of the disclosure.

While the forgoing examples are illustrative of the principles of the example embodiments in one or more particular applications, it will be apparent to those of ordinary skill in the art that numerous modifications in form, usage and details of implementation can be made without the exercise of inventive faculty, and without departing from the principles and concepts of the disclosure. Accordingly, it is not intended that the disclosure be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some example embodiments find industrial application in cellular communication networks, for example in 3GPP networks, wherein beam switching is used.

ACRONYMS LIST

3GPP 3rd Generation Partnership Project
BS Base Station
CE Control Element
DL Downlink
DU Distributed Unit
feMIMO further enhanced Multiple Input Multiple Output
FR Frequency Range
GSM Global System for Mobile communication
HARQ Hybrid Automatic Repeat request
IAB Integrated Access and Backhaul
IoT Internet of Things
LTE Long-Term Evolution
M2M Machine-to-Machine
MAC Medium Access Control
MT Mobile Terminal
NFC Near-Field Communication
NR New Radio
PDCCH Physical DL Control Channel
PDSCH Physical DL Shared Channel PUCCH Physical UL Control Channel
PUSCH Physical UL Shared Channel
QCL Quasi Co-Location
RAN Radio Access Network
RAT Radio Access Technology
RRC Radio Resource Control
RS Reference Signal
SRS Sounding Reference Signal
SSB Synchronization Signal Block
TCI Transmission Configuration Indicator
TRP Transmission and Reception Point
TSG Technical Specification Group
UE User Equipment
UI User Interface
UL Uplink
WCDMA Wideband Code Division Multiple Access
WiMAX Worldwide Interoperability for Microwave Access
WLAN Wireless Local Area Network

| REFERENCE SIGNS LIST | |
| --- | --- |
| 110 | UE |
| 112, 114 | Beams |
| 120 | Wireless network node |
| 125, 135 | Wired interfaces |
| 130 | Core Network |
| 210 | HARQ feedback delay |
| 220 | Slots during which UE 110 cannot be scheduled |
| 230 | Slots during which UE 110 may buffer |
| 240 | Slots during which UE 110 may transmit HARQ feedback |
| 310-328 | Steps in the signaling graph of FIG. 3 |
| 400-470 | Structure of the apparatus of FIG. 4 |
| 510-530 | Phases of the first method in FIG. 5 |

The invention claimed is:

1. An apparatus comprising:

at least one processor; and at least one memory including instructions, wherein the at least one memory and the instructions are configured to, with the at least one processor, cause the apparatus at least to perform:

receiving, from a wireless network node, a Transmission Coordination Indication, TCI, state switch command, the TCI state switch command commanding the apparatus to perform at least an uplink TCI state switch, wherein the TCI state switch command is a unified TCI state switch command commanding the apparatus to switch from a first downlink TCI state to a second downlink TCI state and from a first uplink TCI state to a second uplink TCI state, receiving, from the wireless network node, at least one downlink transmission after completing the switch from the first downlink TCI state to the second downlink TCI state before the uplink TCI state switch is required to be completed, and transmitting, to the wireless network node, feedback information related to the at least one downlink transmission after completing the uplink TCI state switch.

2. The apparatus according to claim 1, caused to perform:

buffering said feedback information related to the at least one downlink transmission at least until the uplink TCI state switch is required to be completed.

3. The apparatus according to claim 1, wherein the apparatus is available to be scheduled to receive at least one downlink transmission starting from the completion of the switch from the first downlink TCI state to the second downlink TCI state.

4. The apparatus according to claim 1, wherein the TCI state switch command is a separate TCI state switch command commanding the apparatus to switch from a first uplink TCI state to a second uplink TCI state.

5. The apparatus according to claim 1, wherein the apparatus is available to be scheduled to receive said at least one downlink transmission starting from a slot that is a feedback delay before the time to complete the uplink TCI state switch expires.

6. The apparatus according to claim 5, wherein the feedback delay is configured by the wireless network node using Radio Resource Control, RRC, signalling.

7. The apparatus according to claim 1, wherein said feedback information is Hybrid Automatic Repeat request, HARQ, information.

8. The apparatus according to claim 1, wherein the apparatus is a user equipment or a control device configured to control the operation of the user equipment.

9. An apparatus comprising:

at least one processor; and at least one memory including instructions, wherein the at least one memory and the instructions are configured to, with the at least one processor, cause the apparatus at least to perform:

transmitting, to a user equipment, a Transmission Coordination Indication, TCI, state switch command, the TCI state switch command commanding the user equipment to perform at least an uplink TCI state switch, wherein the TCI state switch command is a unified TCI state switch command commanding the user equipment to switch from a first downlink TCI state to a second downlink TCI state and from a first uplink TCI state to a second uplink TCI state, transmitting, to the user equipment, at least one downlink transmission after completing the switch from the first downlink TCI state to the second downlink TCI state before the uplink TCI state switch is required to be completed, and receiving, from the user equipment, feedback information related to the at least one downlink transmission after completing the uplink TCI state switch.

10. A method, comprising:

receiving by a user equipment, from a wireless network node, a Transmission Coordination Indication, TCI, state switch command, the TCI state switch command commanding the user equipment to perform at least an uplink TCI state switch, wherein the TCI state switch command is a unified TCI state switch command commanding the user equipment to switch from a first downlink TCI state to a second downlink TCI state and from a first uplink TCI state to a second uplink TCI state;

receiving by the user equipment, from the wireless network node, at least one downlink transmission after completing the switch from the first downlink TCI state to the second downlink TCI state before the uplink TCI state switch is required to be completed; and transmitting by the user equipment, to the wireless network node, feedback information related to the at least one downlink transmission after completing the uplink TCI state switch.

11. The method according to claim 10, further comprising:

buffering said feedback information related to the at least one downlink transmission at least until the uplink TCI state switch is required to be completed.

12. The method according to claim 10, wherein the user equipment is available to be scheduled to receive at least one downlink transmission starting from the completion of the switch from the first downlink TCI state to the second downlink TCI state.

13. The method according to claim 10, wherein the TCI state switch command is a separate TCI state switch command commanding the user equipment to switch from a first uplink TCI state to a second uplink TCI state.

14. The method according to claim 10, wherein the user equipment is available to be scheduled to receive said at least one downlink transmission starting from a slot that is a feedback delay before the time to complete the uplink TCI state switch expires.

15. The method according to claim 14, wherein the feedback delay is configured by the wireless network node using Radio Resource Control, RRC, signalling.

16. The method according to claim 10, wherein said feedback information is Hybrid Automatic Repeat request, HARQ, information.

* * * * *